US012683778B2

(12) United States Patent
Liu

(10) Patent No.: US 12,683,778 B2
(45) Date of Patent: Jul. 14, 2026

(54) ERROR REDUCTION DURING CRYPTOGRAPHIC KEY UPDATES IN SECURE MEMORY DEVICES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 439 days.

(21) Appl. No.: 17/831,364

(22) Filed: Jun. 2, 2022

(65) Prior Publication Data

US 2023/0396431 A1 Dec. 7, 2023

(51) Int. Cl.
H04L 9/08 (2006.01)
H04L 9/32 (2006.01)

(52) U.S. Cl.
CPC .......... H04L 9/0891 (2013.01); H04L 9/0861 (2013.01); H04L 9/0894 (2013.01); H04L 9/3242 (2013.01)

(58) Field of Classification Search
CPC ... H04L 9/0891; H04L 9/0861; H04L 9/0894; H04L 9/3242; H04L 9/0643; H04L 9/083
See application file for complete search history.

(56) References Cited

U.S. PATENT DOCUMENTS 10,361,870 B2 * 7/2019 Chow .................. G06Q 20/382
11,573,929 B2 * 2/2023 Biondo Junior ...... H04L 9/0643

2006/0294378 A1 * 12/2006 Lumsden ........... G06Q 20/3829
713/171
2010/0031021 A1 * 2/2010 Arnold .................. H04L 9/0822
713/190
2014/0247939 A1 * 9/2014 Hattori .................... H04L 9/008
380/44
2019/0081796 A1 * 3/2019 Chow .................... G06Q 20/34
2020/0100108 A1 * 3/2020 Everson ................ H04L 9/3242
2022/0188423 A1 * 6/2022 Ndu ........................ G06F 21/566
2022/0231842 A1 * 7/2022 Onuki .................... H04L 9/083
2022/0263650 A1 * 8/2022 Falk ...................... H04L 9/0877
2024/0039709 A1 * 2/2024 Ma .......................... H04L 9/085
2024/0121083 A1 * 4/2024 London .................... H04L 9/30
2024/0157893 A1 * 5/2024 Isoyama ................ H04L 67/12
2024/0380578 A1 * 11/2024 Wright .................... H04L 9/085

* cited by examiner

*Primary Examiner* — Blake I Narramore
(74) *Attorney, Agent, or Firm* — Greenberg Traurig

(57) ABSTRACT

The disclosure relates to improvements in key delivery to secure memory devices. In some implementations, the techniques described herein relate to a system including: a memory device including a key storage area; a key management server (KMS) configured to receive a key request, generate a cryptographic key, compute a hash of the cryptographic key, and return the cryptographic key and the hash in response to the key request; and a manufacturer computing device configured to receive the cryptographic key and the hash as part of the response to the key request and issue a command including the cryptographic key and the hash to the memory device, wherein the memory device is configured to compute a local hash using the cryptographic key in the command, compare the local hash to the hash, and write the cryptographic key to the key storage area when the local hash matches the hash.

20 Claims, 7 Drawing Sheets

700

ERROR REDUCTION DURING CRYPTOGRAPHIC KEY UPDATES IN SECURE MEMORY DEVICES

FIELD OF THE TECHNOLOGY

At least some embodiments disclosed herein relate generally to memory devices (e.g., semiconductor memory devices) and, in particular, to improvements in key storage on secure memory devices.

BACKGROUND

Some memory devices may store cryptographic keys to perform cryptographic operations. Some such secure memory devices may use stored public keys to validate sensitive data (e.g., secure commands, digital signatures, etc.) that are signed using corresponding private keys. If the underlying content of a key is corrupted, current secure memory devices do not provide mechanisms to prevent the writing of an invalid key. As such, if an invalid key is validly provided to such a secure memory device, the invalid key will be persisted, resulting in a malfunctioning or unusable memory device.

DETAILED DESCRIPTION

Figure 1:
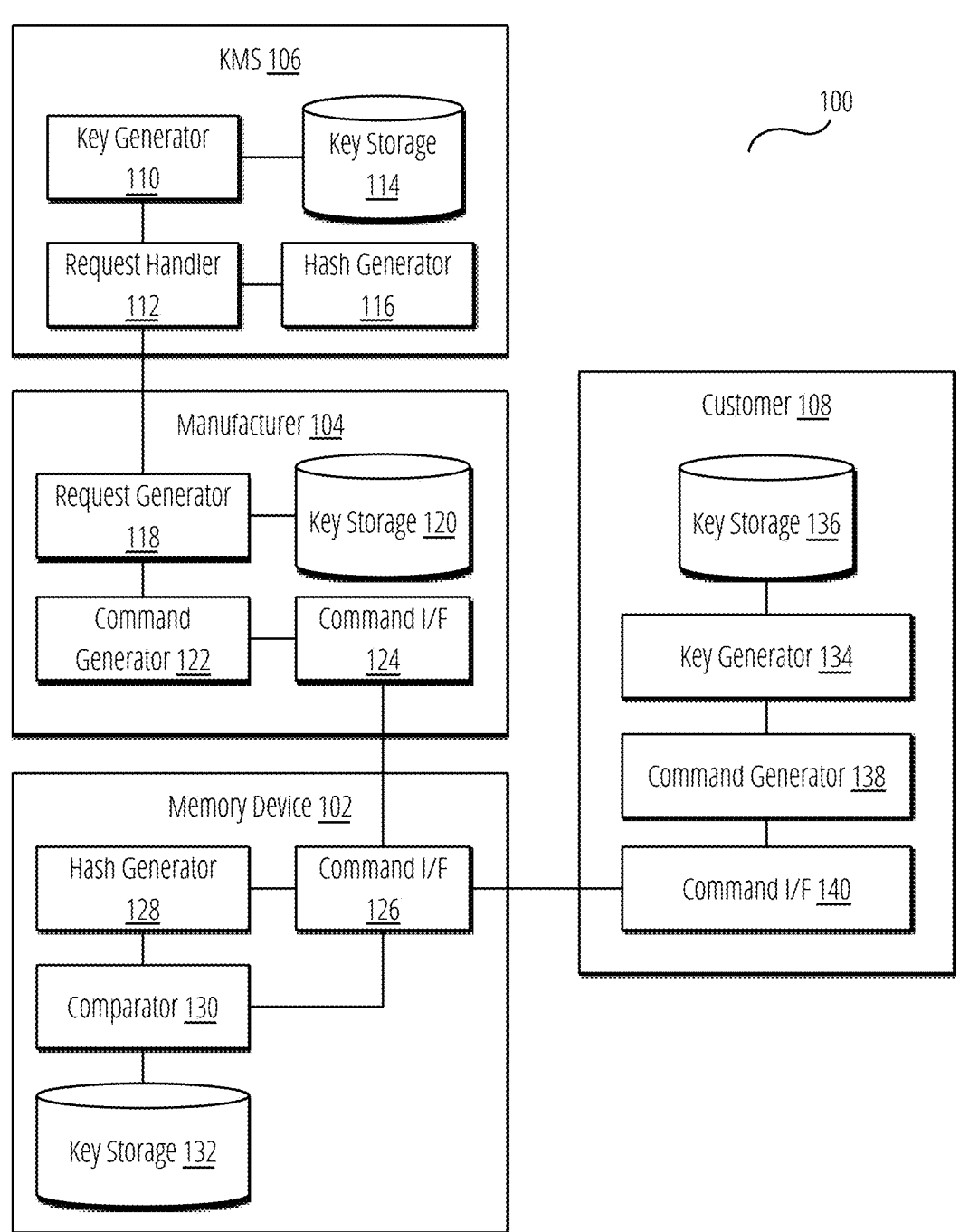
FIG. 1 is a block diagram of a computing system according to some of the example embodiments.

A trusted key management server (KMS) generates cryptographic keys for a memory device in existing systems. In general, these keys may be public keys of asymmetric key pairs. The KMS then securely provides these keys to a memory device manufacturer (e.g., via an out-of-band interface or secure communications channel). Before releasing a memory device, the manufacturer writes the keys to the memory device via a dedicated manufacturer command (e.g., a command not available after the manufacturer releases the memory device). After a customer receives a memory device, it may write its own key to the memory device (e.g., its own public key), effectively overwriting the manufacturer's key. Thus, a customer can then sign secure commands using its own private key.

In such a system, multiple parties are involved, ultimately writing a key to a memory device. If any party introduces an error or mistake (e.g., using the wrong Endian or key parameters) in the key delivery process, the memory device may be rendered unusable. For example, the key stored by the memory device can be used to verify secure commands (including resetting or replacing a key). If the key is not valid, such commands may not be executable.

As a more specific example, a customer may generate a command to replace the public key with its own key. The customer may transmit this command to the KMS (or manufacturer), which signs the key using the private key corresponding to the manufacturer's public key stored by the memory device. The customer then issues the signed command to replace the public key, and the memory device validates the signature and replaces the key. However, if the public key included in the signed command uses the wrong Endianness, the public key cannot be used to validate signatures. Thus, when the customer attempts to sign a secure command (e.g., to update or add a key), the signature validation will fail. Thus, the memory device will be "locked" into using an invalid key with no means for the customer to independently reset the key. Thus, the customer will be required to physically return the memory device to the manufacturer for zeroing, which both results in data loss and loss of use of the memory device. Further, in some systems, physical access to the device may not be practical or possible, thus resulting in a total loss of the memory device.

In some implementations, the techniques described herein relate to a system including a memory device including a key storage area; a key management server (KMS) configured to receive a key request, generate a cryptographic key, compute a hash of the cryptographic key, and return the cryptographic key and the hash in response to the key request; and a manufacturer computing device configured to receive the cryptographic key and the hash as part of the response to the key request and issue a command including the cryptographic key and the hash to the memory device, wherein the memory device is configured to compute a local hash using the cryptographic key in the command, compare the local hash to the hash, and write the cryptographic key to the key storage area when the local hash matches the hash.

In some implementations, the techniques described herein relate to a system, wherein the cryptographic key includes one of a public key portion or private key portion of an asymmetric key pair.

In some implementations, the techniques described herein relate to a system, wherein the cryptographic key includes a Unique Device Secret.

In some implementations, the techniques described herein relate to a system, wherein the cryptographic key includes symmetric key.

In some implementations, the techniques described herein relate to a system, wherein the manufacturer computing device is further configured to detect a failure response associated with the command, request a second cryptographic key and a second hash from the KMS in response to the failure response, and issue a second command including the second cryptographic key and the second hash to the memory device.

In some implementations, the techniques described herein relate to a system further including a customer computing device, the customer computing device configured to: generate a second cryptographic key and a second hash corresponding to the second cryptographic key; and issue a second command including the second cryptographic key and the second hash to the memory device; wherein the memory device is configured to compute a second local hash using the second cryptographic key in the second command, compare the second local hash to the second hash, and write the second cryptographic key to the key storage area if the second local hash is equal to the second hash.

In some implementations, the techniques described herein relate to a system, wherein the customer computing device is further configured to include a signature in the second command.

In some implementations, the techniques described herein relate to a system, wherein writing the second cryptographic key to the key storage area includes overwriting an existing cryptographic key.

In some implementations, the techniques described herein relate to a system, wherein the memory device is further configured to determine that the local hash does not match the hash and, in response, not write the cryptographic key to the key storage area.

In some implementations, the techniques described herein relate to a system, wherein the memory device returns a failure response in response to determining that the local hash does not match the hash.

In some implementations, the techniques described herein relate to a method including: receiving, by a memory device, a command, the command including a cryptographic key and a hash of the cryptographic key; generating, by the memory device, a local hash by inputting the cryptographic key into a hashing algorithm; determining, by the memory device, whether the local hash matches the hash included in the command; writing, by the memory device, the cryptographic key to a key storage area if the local hash matches the hash included in the command; and returning, by the memory device, a failure response if the local hash does not match the hash included in the command.

In some implementations, the techniques described herein relate to a method, wherein the cryptographic key includes one of a public key, a private key, a symmetric key, and a Unique Device Secret.

In some implementations, the techniques described herein relate to a method, wherein determining whether the local hash matches the hash included in the command includes determining if the local hash is equal to the hash included in the command.

In some implementations, the techniques described herein relate to a method, wherein writing the cryptographic key to a key storage area includes overwriting an existing key stored in the key storage area.

In some implementations, the techniques described herein relate to a method, wherein returning a failure response includes returning failure response data as part of the failure response.

In some implementations, the techniques described herein relate to a non-transitory computer-readable storage medium for tangibly storing computer program instructions capable of being executed by a computer processor, the computer program instructions defining steps of: receiving a command, the command including a cryptographic key and a hash of the cryptographic key; generating a local hash by inputting the cryptographic key into a hashing algorithm; determining whether the local hash matches the hash included in the command; writing the cryptographic key to a key storage area if the local hash matches the hash included in the command; and returning a failure response if the local hash does not match the hash included in the command.

In some implementations, the techniques described herein relate to a non-transitory computer-readable storage medium, wherein the cryptographic key includes one of a public key, a private key, a symmetric key, and a Unique Device Secret.

In some implementations, the techniques described herein relate to a non-transitory computer-readable storage medium, wherein determining whether the local hash matches the hash included in the command includes determining if the local hash is equal to the hash included in the command.

In some implementations, the techniques described herein relate to a non-transitory computer-readable storage medium, wherein writing the cryptographic key to a key storage area includes overwriting an existing key stored in the key storage area.

In some implementations, the techniques described herein relate to a non-transitory computer-readable storage medium, wherein returning a failure response includes returning failure response data as part of the failure response.

FIG. 1 is a block diagram of a computing system according to some of the example embodiments.

The illustrated system 100 includes a memory device 102, manufacturer 104, KMS 106, and customer 108. The memory device 102, manufacturer 104, KMS 106, and customer 108 can be implemented as one or more computing devices. For example, memory device 102 may be implemented similar to computing system 600, while manufacturer 104, KMS 106, and customer 108 may be implemented as one or more computing devices such as device 700. Operational and other details of the KMS 106, manufacturer 104, memory device 102, and customer 108 are also described in connection with FIG. 2, FIG. 3, FIG. 4, and FIG. 5, respectively, and those details are incorporated herein in their entirety.

In the illustrated system 100, the KMS 106 includes a request handler 112. In some implementations, the request handler 112 can include a secure Hypertext Transport Protocol (HTTP) server that can receive network requests using a secure transport layer security (TLS) protocol. One such request includes a key request which causes the KMS 106 to generate a cryptographic key as described in more detail herein.

In response to a key request, the request handler 112 instructs the key generator 110 to generate a key. Details of key generation are provided in FIG. 2 and not repeated herein. In brief, the key can comprise a cryptographic key generated using a well-defined algorithm such as a Diffie-Hellman (DH), Elliptic Curve Digital Signature Algorithm (ECDSA), Elliptic-curve Diffie-Hellman (ECDH), Rivest-Shamir-Adleman (RSA), or similar type of algorithm. The specific type of algorithm is not limiting. The key generator 110 can persist keys in a secure storage area such as key storage 114. In some implementations, the key storage 114 can be a secure storage device such as a hardware security module (HSM) or similar type of device. The request handler 112 can receive the generated key and hash the key using a hash generator 116. The hash generator 116 can include any well-known hash algorithm that converts a given input to a fixed length hash value. The request handler 112 can combine the key generated by key generator 110 and the hash generated by hash generator 116 into a response and return the response to the calling party (e.g., manufacturer 104).

The manufacturer 104 includes a request generator 118 capable of generating and issuing a request for one or more keys from the KMS 106. As discussed in FIG. 2, the request can include various parameters controlling the key generation process, which are not repeated herein. Upon receiving a key and a hash from the KMS 106, the request generator 118 can store the key in a key storage 120. As with key storage 114, the key storage 120 can comprise an HSM or similar device. The manufacturer 104 also includes a command generator 122, which can generate commands processible by the memory device 102. As discussed in FIG. 3, this command can be a manufacturing command that is only available when the memory device 102 is being manufactured. The command further can include the key and the hash received from the KMS 106. The manufacturer 104 can communicate with the memory device 102 via a command interface 124, which can comprise (for example) a serial peripheral interface (SPI), universal asynchronous receiver-transmitter (UART) interface, peripheral component interconnect express (PCIe), wireless fidelity (Wi-Fi), Ethernet, or another type of interface. As discussed in FIG. 3, the manufacturer 104 issues a command to write a key to the memory device 102 and awaits a response. Based on the response, manufacturer 104 can determine whether the key was written or if remedial measures should be taken.

The memory device 102 includes a command interface 126 corresponding to the command interface 124. The memory device 102 receives commands over the command interface 126, including the command to write a key. In response to such a command, a hash generator 128 generates a local hash using the received key in the command, and a comparator 130 compares the local hash to the hash received in the command. If the two hashes match (e.g., are equal), the memory device 102 can write the key to a key storage area 132 of the memory device 102 (e.g., an HSM). In some scenarios, this write can result in overwriting an existing key. The memory device 102 is then further able to return a response to the memory device 102 (or 108//) based on the command indicating whether the write was performed and successful or whether a failure occurred.

The illustrated system 100 can also include a customer 108 that can write their own public key to the memory device 102. Customer 108 includes a key generator 134, which functions similarly to key generator 110. In some implementations, the algorithm used by key generator 134 is the same as that used by key generator 110; however, this is not required. After generating a key, customer 108 can store the key in key storage 136 (e.g., an HSM). Customer 108 also can generate a command via the command generator 138, which operates similar to command generator 122. Command generator 138 differs from command generator 122 in that it can only generate valid commands after manufacturing. In some implementations, these commands can include a replace key command that allows the customer 108 to replace a key. In some implementations, the replace key command can be signed by the KMS 106 using a private key corresponding to a public key stored in key storage area 132. Customer 108 can issue the command to the memory device via a command interface 140 and await a success or failure response. Upon a successful response, the memory device 102 will update its key with the key generated by customer 108.

Figure 2:
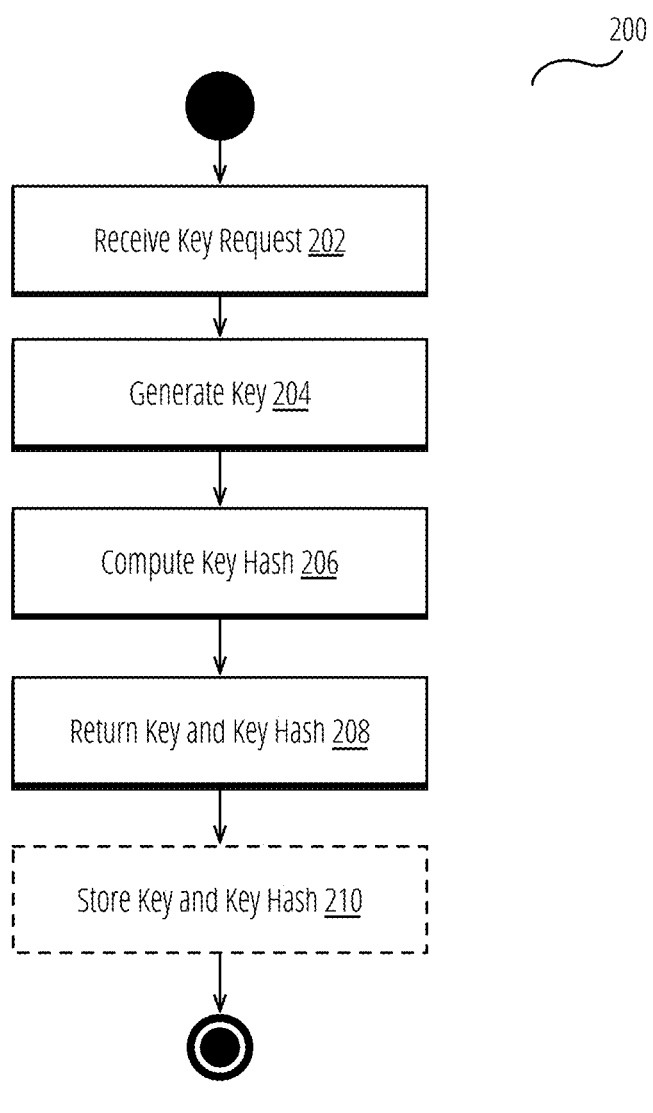
FIG. 2 is a flow diagram illustrating a method for generating a cryptographic key for a secure memory device according to some of the example embodiments.

FIG. 2 is a flow diagram illustrating a method for generating a cryptographic key for a secure memory device according to some of the example embodiments. A KMS (such as KMS 106 in FIG. 1) may execute method 200. The description of method 200 provided below is provided in the context of a single key; however, method 200 is not limited as such, and references to a single key apply equally to scenarios where multiple keys are involved.

In step 202, method 200 can include receiving a key request.

A manufacturer or customer may generate and issue a key request. Method 200 can receive the key request via, for example, a secure network interface (e.g., secure Hypertext Transport Protocol request). In some implementations, a user or device submitting a key request may be authenticated prior to method 200 executing. For example, a user or manufacturer may authenticate to the device executing method 200 via a login or other type of authentication mechanism, which is non-limiting. The key request can include parameters describing the request such as the intended use of the key, generation algorithm type, etc., all of which are non-limiting. For example, the key request can include a layer identifier in a DICE architecture and a protocol to use (e.g., ECDH, ECDSA, etc.). Alternatively, the key request can include no such parameters and the device executing method 200 can operate using default parameters.

In step 204, method 200 can include generating a key in response to the key request.

In response to the key request, method 200 can execute a key generation algorithm to generate a key. The key generally is a cryptographic key. In some implementations, the key may be a symmetric key. However, in other implementations, the key may be part of an asymmetric key pair. In this implementation, the key generated in step 204 can include a public key and a corresponding private key. However, in the following steps, references to a "key" generally refer to a public key in an asymmetric key implementation unless explicitly noted otherwise (mainly in step 210). However, in some embodiments, private keys, Unique Device Secrets (in a Device Identity Composition Engine, DICE, system), or other cryptographic or sensitive data may be used instead. The disclosure does not limit the type of algorithm used to generate a key and various types of algorithms and protocols (e.g., DH, ECDH, ECDSA) can be used. As discussed above, step 204 can include generating multiple keys. For example, method 200 can be extended to operate in a batch mode whereby a single key request can be used to receive multiple keys. In such a mode, the key request can include the number of keys to generate. Such a batch mode may be useful for manufacturers performing bulk provisioning of memory devices. Further, as another example, the key request can include a request for multiple, different types of keys (e.g., used for different purposes). Thus, method 200 can be extended to generate multiple types of keys in response to such a request.

In step 206, method 200 can include computing a hash of the key.

In a symmetric implementation, method 200 can compute the hash using the symmetric key as the input to the hashing algorithm. In an asymmetric implementation, method 200 can compute the hash using the public key as the input to the hashing algorithm. The choice of hashing algorithm is non-limiting and any algorithm that can generate a suitably unique digest output can be used. For example, step 206 can use a SHA-256, SHA-384, SHA-512, SHA3-224, SHA3-256, SHA3-384, SHA3-512, BLAKE2, BLAKE2s, BLAKE2b, RIPEMD-160, or Keccak-256. In general, a hash function will convert an input (i.e., the key) into a fixed-length output that provides high collision avoidance with other outputs. In some algorithms, the hash function may also take a desired output length as a parameter and, if so, method 200 can utilize a suitable output length (which is non-limiting).

In step 208, method 200 can include returning the key and the hash as a response to the key request.

The returned key can be either a symmetric key or a public key portion of an asymmetric key pair, as discussed previously. In some implementations, the response includes a single key and a corresponding hash generated in step 206. In other implementations, when multiple keys are generated, the response can be represented as a dictionary or map structure mapping keys to hashes. Other data structures may be used. Method 200 can transmit the key(s) and hash(es) as a response to the key request received in step 202. Thus, as one example, the response can be an HTTPS response to an HTTP request including the key request. Other network protocols may be used.

In step 210, method 200 can optionally include storing the key and hash.

In most implementations, the device executing method 200 will store the generated keys and hashes; however, this may not be required. In one implementation, step 210 can include securely storing the keys and hashes in, for example, an HSM or similar type of data storage device. Step 210 can include associating the keys and hashes with an account associated with the key request to enable retrieval by the same user or account. In some implementations, step 210 may only include storing the keys (and associated accounts) and may not include storing the hashes. In this implementation, method 200 can include re-generating a hash if needed in the future using the stored keys and the same hashing algorithm used in step 206.

In the foregoing method 200, a KMS (or other device) executing method 200 can thus manage all keys and corresponding hashes on behalf of requesting users (e.g., manufacturers). As will be discussed next, these keys can be installed in memory device or another type of semiconductor devices and used for cryptographic operations.

Figure 3:
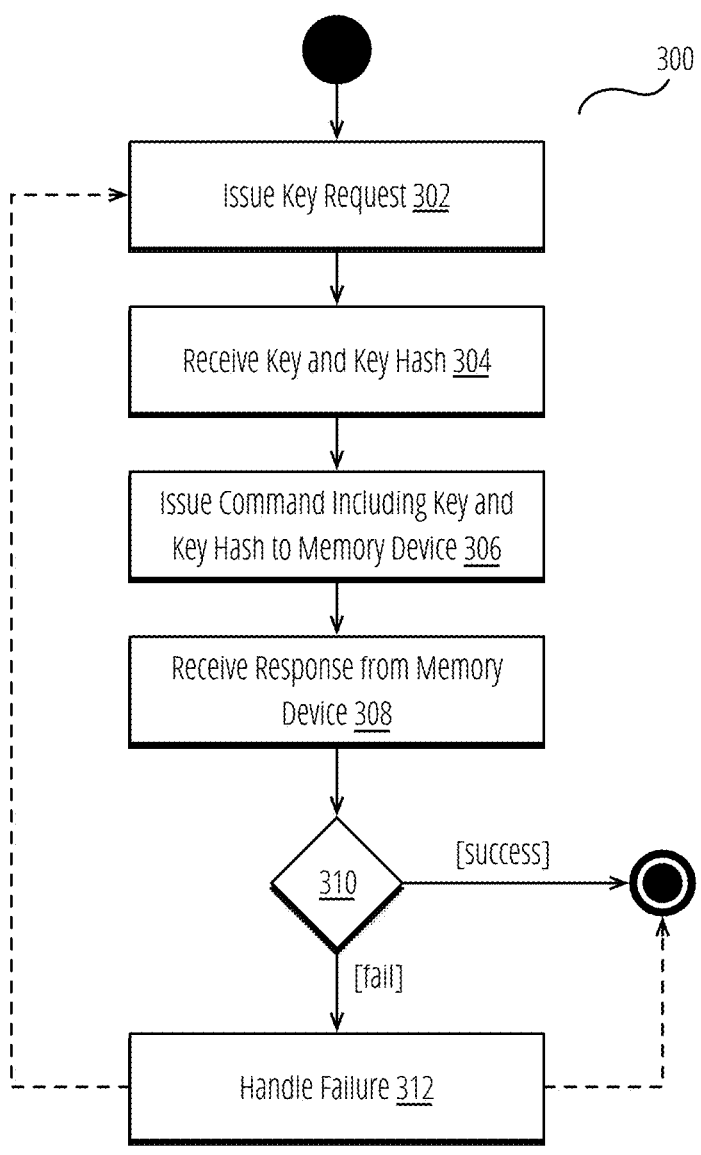
FIG. 3 is a flow diagram illustrating a method for programming a manufacturer's cryptographic key in a secure memory device according to some example embodiments.

FIG. 3 is a flow diagram illustrating a method for programming a manufacturer's cryptographic key in a secure memory device according to some example embodiments. A manufacturer computing device (such as manufacturer 104 in FIG. 1) may execute method 300. The description of method 300 provided below is provided in the context of a single key and a single memory device; however, method 300 is not limited as such and references to a single key or memory device apply equally to scenarios where multiple keys or memory devices are involved.

In step 302, method 300 can include issuing a key request to a KMS and, in step 304, receiving a key and a hash from the KMS in response. Details of this key request were provided in the description of FIG. 2 and are not repeated herein.

In step 306, method 300 can include issuing a command to a memory device, the command including the key and hash. In an implementation, the command can be a manufacturer's command that is only capable of being issued while the memory device is possessed by the manufacturer. Such a command may be replaced with a NOOP command once the memory device is released from manufacturing. Specifically, in step 306, the memory device may not include any cryptographic keys and thus the command issued in step 306 may only be enabled in a secure environment and then removed from the instruction set of the memory device.

In step 308, method 300 can include receiving a response from the memory device. The response may be a success or failure response indicating whether the command was successful. In some implementations, the command is successful if the memory device has written the key in the command from step 306 (including both new writes as well as overwriting an existing key). In some implementations, a command fails if the memory device does not write the key for some reason. As discussed more in FIG. 4, one such reason is that the hash cannot be validated. Other reasons may also raise failures, including command malformation, key length errors, etc.

In step 310, method 300 can include determining which type of response was received: success or failure. If method 300 receives a successful response from the memory device, method 300 ends as the memory device has successfully written the key provided in step 306. By contrast, if the command issued in step 306 fails, method 300 proceeds to step 312.

In step 312, method 300 can include handling a failure response to the command issued in step 306. As discussed above, a failure can arise under many conditions, however one such condition is that the hash provided in the command cannot be validated. As will be discussed in FIG. 4, the memory device recomputes its own hash to confirm that the data it has received is valid. If this comparison fails, the command fails and a failure response is transmitted.

When faced with a failure state, method 300 may take various actions. FIG. 3 illustrates two such alternative paths in dashed lines. In one implementation, method 300 can simply terminate. In actual implementation, method 300 may include displaying an error message (or another indicator) to a human operator to indicate that the command failed. Ultimately, the choice of user interface may be left to the implementation of method 300. In general, however, this option represents an attempt to write the key and then prompt for assistance if the key fails. As another alternative, method 300 can attempt to perform various corrections on the current key and re-execute. For example, method 300 can change the Endianness of the key and re-execute. Such common errors may be enumerated and method 300 re-executed for each type of error.

By contrast, in another implementation, method 300 may immediately return to step 302 and effectively re-execute itself. That is, method 300 can request another key and hash from the KMS and attempt to write the new key and hash to the memory device. In some implementations, method 300 can re-execute like this until a successful response is received. However, in other implementations, method 300 may only re-execute itself a limited number of times. For example, method 300 may only attempt to request a new key and write this new key five times. Generally, sporadic errors in the key or hash are likely caused by corruption (e.g., Endianness switch) during network transmission or command transmissions and are very unlikely. Thus, in practice, method 300 may only need re-execute once to successfully write a key. However, if repeated errors occur, such errors may be caused by more fundamental errors in the process (e.g., Endianness errors). In such a scenario, part of the foregoing processes of FIGS. 2 and 3 (and, as will be discussed, FIG. 4) includes a bug or other flaw that needs to be addressed. As such, method 300 may only re-execute a fixed number of times before ending (and alerting a user of a potential fault in the system).

Figure 4:
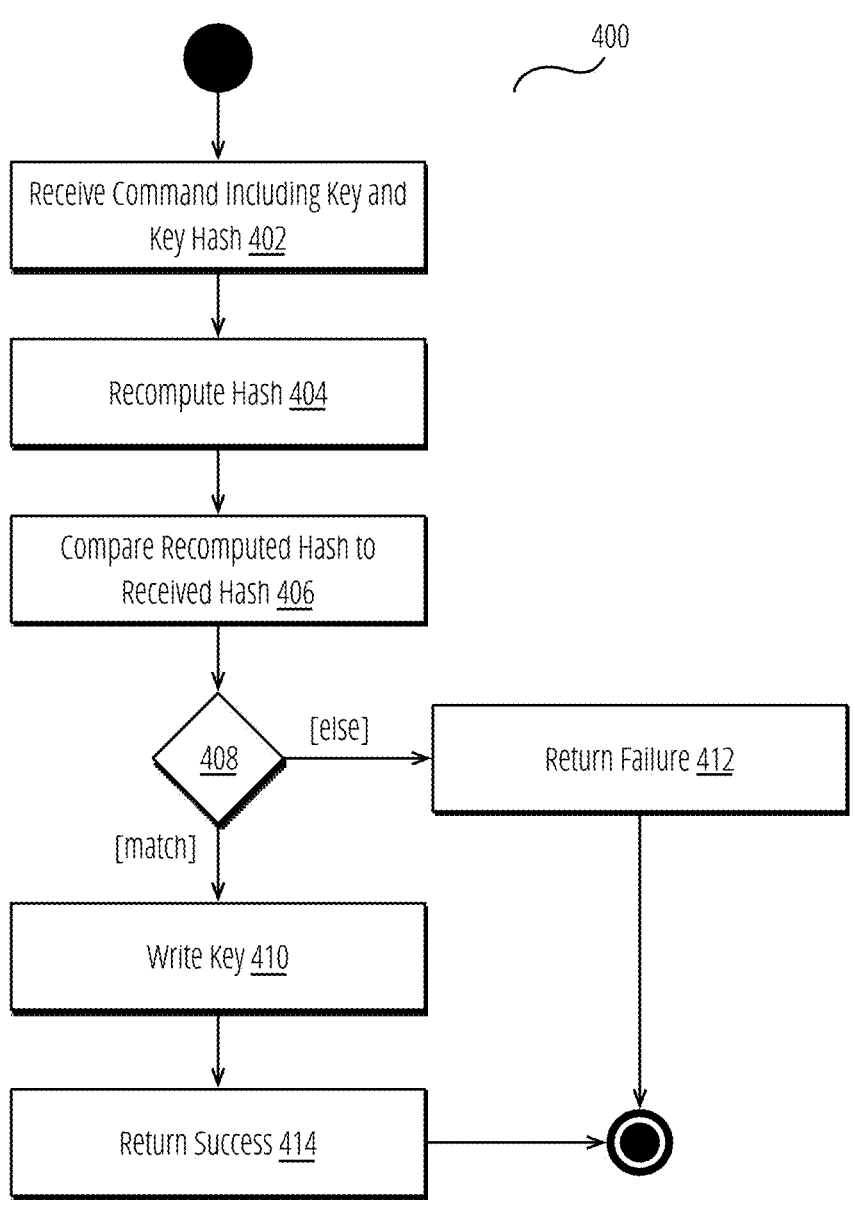
FIG. 4 is a flow diagram illustrating a method for validating a cryptographic key by a secure memory device according to the example embodiments.

FIG. 4 is a flow diagram illustrating a method for validating a cryptographic key by a secure memory device according to the example embodiments. A memory device (such as memory device 102 in FIG. 1) may execute method 400. The description of method 400 provided below is provided in the context of a single key, however, method 400 is not limited as such and references to a single key apply equally to scenarios where multiple keys are involved.

In step 402, method 400 can include receiving a command, the command including a cryptographic key and a hash. In one scenario, method 400 receives the command from a manufacturer computing device (as described in FIG.

3). In another scenario, method 400 receives the command from a customer computing device (as will be discussed in FIG. 5). Details of the cryptographic key and hash have been described previously and are not repeated herein. In brief, the cryptographic key can comprise a public key or symmetric key (or similar cryptographic data) and the hash includes a hash computed using the cryptographic key as an input.

In step 404, method 400 can include e recomputing a hash. In this step, method 400 independently computes a hash using the cryptographic key included in the command received in step 402. No limitation is placed on the type of hashing algorithm, as discussed in FIG. 2. However, in most implementations, the hashing algorithm used in step 404 should match the hashing algorithm used in step 206 of FIG. 2.

In step 406, method 400 can include comparing the hash computed in step 404 (referred to as the local hash) and the hash received in the command received in step 402 (referred to as the received hash). In general, the comparison includes a strict comparison to determine if the local hash and the received hash are bytewise identical.

In step 408, method 400 can include determining whether the local hash and the received hash are indeed identical or otherwise matching (the disclosure does not foreclose systems that rely on fuzzy matching between hashes).

If method 400 determines that the local hash and received hash do not match (e.g., are not equal), method 400 can, in step 412, return a failure to the device that issued the command of step 402. In some implementations, the failure can comprise a flag or other data structure indicating a failure. In other implementations, the memory device can attempt to provide further failure response data regarding the failure. In general, the memory device only has access to two hashes: the local and remote hash. Thus, the memory device may be limited in the detail of error messages provided. However, the memory device can still provide useful information that can be used by the calling party. For example, the memory device can provide the two number of unmatching bits between the two hashes. If a local hash is computed on a different input than the received hash, this value will be high, frequently most or all of the bits. By contrast, if the received hash was malformed during transmission, only a few bits may be mismatched. In response, a calling party can make decisions on how best to retry (as discussed).

If, in step 408, method 400 determines that the local hash and the received hash match (e.g., are equal), method 400 proceeds to step 410 where the key received in the command is written. In some implementations, the key can be written to a secure key storage area of the memory device and subsequently used for cryptographic operations performed by the memory device (e.g., signature validation). In some scenarios, the writing of the key can include overwriting an existing key. In such a scenario, the overwriting of a key may operate as an ownership transfer of the device (since only the owner of the private key can sign data that can be validated by the memory device). Finally, after writing a key to the key storage area, method 400 returns a success response in step 414, indicating that the write was successful.

Figure 5:
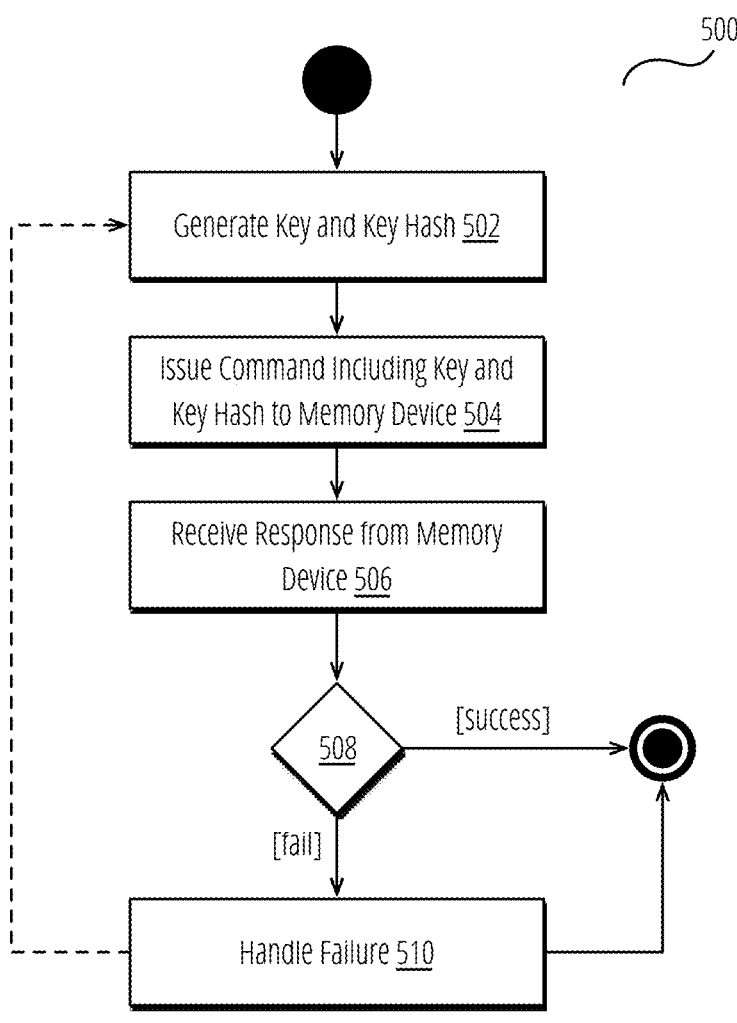
FIG. 5 is a flow diagram illustrating a method for programming a customer's cryptographic key in a secure memory device according to some example embodiments

FIG. 5 is a flow diagram illustrating a method for programming a customer's cryptographic key in a secure memory device according to some example embodiments. A customer computing device (such as customer 108 in FIG. 1) may execute method 500. The description of method 500 provided below is provided in the context of a single key and a single memory device, however method 500 is not limited as such and references to a single key or memory device apply equally to scenarios where multiple keys or memory devices are involved.

In step 502, method 500 can include generating a key and a hash of the key.

Method 500 can execute a key generation algorithm to generate a key. The key generally is a cryptographic key. In some implementations, the key may be a symmetric key. However, in other implementations, the key may be part of an asymmetric key pair. In this implementation, the key generated in step 502 includes a public key and a corresponding private key. However, in the following steps, references to a "key" generally refers to a public key in an asymmetric key implementation unless explicitly noted otherwise. The disclosure does not limit the type of algorithm used to generate a key and various types of algorithms and protocols (e.g., DH, ECDH, ECDSA) can be used. As discussed above, step 502 can include generating multiple keys. For example, method 500 can be extended to operate in a batch mode whereby multiple keys can be generated. In such a mode, the customer can specify the number of keys to generate. Such a batch mode may be useful for customers performing bulk re-provisioning of memory devices. Further, as another example, step 502 can include generating different types of keys (e.g., used for different purposes). Thus, method 500 can be extended to generate multiple types of keys.

In a symmetric implementation, step 502 can include computing a hash using the symmetric key as the input to the hashing algorithm. In an asymmetric implementation, step 502 can include computing the hash using the public key as the input to the hashing algorithm. The choice of hashing algorithm is non-limiting and any algorithm that can generate a suitably unique digest output can be used. For example, step 206 can use a SHA-256, SHA-384, SHA-512, SHA3-224, SHA3-256, SHA3-384, SHA3-512, BLAKE2, BLAKE2s, BLAKE2b, RIPEMD-160, or Keccak-256. In general, a hash function will convert an input (i.e., the key) into a fixed-length output that provides high collision avoidance with other outputs. In some algorithms, the hash function may also take a desired output length as a parameter and, if so, step 502 can utilize a suitable output length (which is non-limiting).

Notably, in method 500, a customer generates its own keys and thus is charged with maintaining the security of such data. For example, as described in FIG. 2, the customer can store the keys and (if needed) hashes in an HSM or other type of secure key storage area (similar to that discussed in step 210).

In step 504, method 500 can include issuing a command to a memory device, the command including the key and hash generated. In an implementation, the command can be a dedicated command for writing a key to the memory device. In some implementations, the command (and data thereto) must be signed by the current owner of the key stored in the memory device. For example, the command must be signed by the holder of a private key corresponding to the public key stored in the memory device. As an example, if the current public key of the memory device was generated by a KMS (as described in FIG. 2), the customer must first obtain a signature for the command by the KMS (which is generated using the KMS's private key). The customer can authenticate to the KMS (and provide a device identifier of the memory device), provide the command, and receive this signature. In some implementations, the KMS can be configured to manage the customer's keys and thus can persist the customer-generated public key (and optional hash) in its own HSM or similar storage module. Details on the operations performed by the memory device in response to the command issued in step 504 were provided in FIG. 4 and are not described herein.

In step 506, method 500 can include receiving a response from the memory device. The response may be a success or failure response indicating whether the command was successful. In some implementations, the command is successful if the memory device has written the key in the command from step 504 (including both new writes as well as overwriting an existing key). In some implementations, a command fails if the memory device does not write the key for some reasons. As discussed more in FIG. 4, one such reason is that the hash cannot be validated. Other reasons may also raise failures including command malformation, key length errors, etc.

In step 508, method 500 can include determining which type of response was received: success or failure. If method 500 receives a successful response from the memory device, method 500 ends as the memory device has successfully written the key provided in step 504. By contrast, if the command issued in step 504 fails, method 500 proceeds to step 510.

In step 510, method 500 can include handling a failure response to the command issued in step 504. As discussed above, a failure can arise under many conditions, however one such condition is that the hash provided in the command cannot be validated. As discussed in FIG. 4, the memory device recomputes its own hash to confirm that the data it has received is valid. If this comparison fails, the command fails, and a failure response is transmitted. As another alternative, method 500 can attempt to perform various corrections on the current key and re-execute. For example, method 500 can change the Endianness of the key and re-execute. Such common errors may be enumerated and method 500 re-executed for each type of error.

When faced with a failure state, method 500 may take various actions. FIG. 5 illustrates two such alternative paths in dashed lines. In one implementation, method 500 can simply terminate. In actual implementation, method 500 may include displaying an error message (or another indicator) to the customer to indicate that the command failed. Ultimately, the choice of user interface may be left to the implementation of method 500. In general, however, this option represents an attempt to write the key and then prompt for assistance if the key fails.

By contrast, in another implementation, method 500 may immediately return to step 502 and effectively re-execute itself. That is, method 500 can generate another key and hash and attempt to write the new key and hash to the memory device. In some implementations, method 500 can re-execute like this until a successful response is received. However, in other implementations, method 500 may only re-execute itself a limited number of times. For example, method 500 may only attempt to request a new key and write this new key five times. Generally, sporadic errors in the key or hash are likely caused by corruption during network transmission or command transmissions and are very unlikely. Thus, in practice, method 500 may only need re-execute once to successfully write a key. However, if repeated errors occur, such errors may be caused by more fundamental errors in the process (e.g., Endianness errors). In such a scenario, part of the foregoing processes of FIG. 2 through FIG. 4 includes a bug or other flaw that needs to be addressed. As such, method 500 may only re-execute a fixed number of times before ending (and alerting a user of a potential fault in the system).

Figure 6:
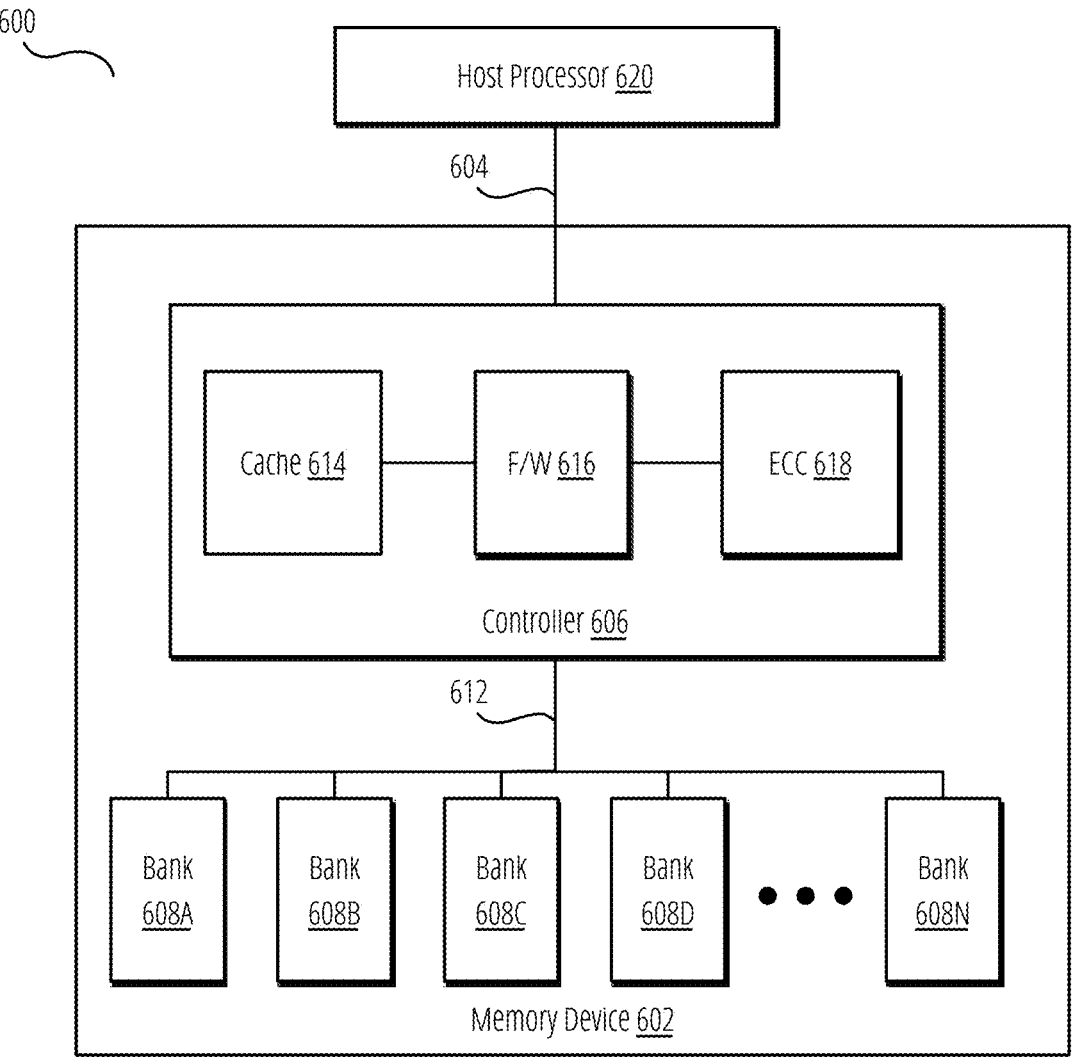
FIG. 6 is a block diagram illustrating a computing system according to some of the example embodiments.

FIG. 6 is a block diagram illustrating a computing system according to some embodiments of the disclosure.

As illustrated in FIG. 6, a computing system 600 includes a host processor 620 communicatively coupled to a memory device 602 via a bus 604. The memory device 602 comprises a controller 606 communicatively coupled to one or more memory banks (e.g., bank 608A, bank 608B, bank 608C, bank 608D, bank 608N, etc.) forming a memory array via a interface 612. As illustrated, the controller 606 includes a local cache 614, firmware 616, and an ECC module 618.

In the illustrated embodiment, host processor 620 can comprise any type of computer processor, such as a central processing unit (CPU), graphics processing unit (GPU), or other types of general-purpose or special-purpose computing devices. The host processor 620 includes one or more output ports that allow for the transmission of address, user, and control data between the host processor 620 and the memory device 602. In the illustrated embodiment, this communication is performed over the bus 604. In one embodiment, the bus 604 comprises an input/output (I/O) bus or a similar type of bus.

The memory device 602 is responsible for managing one or more memory banks (e.g., bank 608A, bank 608B, bank 608C, bank 608D, bank 608N, etc.). In one embodiment, the memory banks (e.g., bank 608A, bank 608B, bank 608C, bank 608D, bank 608N, etc.) comprise NAND Flash dies or other configurations of non-volatile memory. In one embodiment, the memory banks (e.g., bank 608A, bank 608B, bank 608C, bank 608D, bank 608N, etc.) comprise a memory array.

The memory banks (e.g., bank 608A, bank 608B, bank 608C, bank 608D, bank 608N, etc.) are managed by the controller 606. In some embodiments, the controller 606 comprises a computing device configured to mediate access to and from banks (e.g., bank 608A, bank 608B, bank 608C, bank 608D, bank 608N, etc.). In one embodiment, the controller 606 comprises an ASIC or other circuitry installed on a printed circuit board housing the memory banks (e.g., bank 608A, bank 608B, bank 608C, bank 608D, bank 608N, etc.). In some embodiments, the controller 606 may be physically separate from the memory banks (e.g., bank 608A, bank 608B, bank 608C, bank 608D, bank 608N, etc.). The controller 606 communicates with the memory banks (e.g., bank 608A, bank 608B, bank 608C, bank 608D, bank 608N, etc.) over the interface 612. In some embodiments, this interface 612 comprises a physically wired (e.g., traced) interface. In other embodiments, the interface 612 comprises a standard bus for communicating with memory banks (e.g., bank 608A, bank 608B, bank 608C, bank 608D, bank 608N, etc.).

The controller 606 comprises various modules including local cache 614, firmware 616 and ECC module 618. In one embodiment, the various modules (e.g., local cache 614, firmware 616 and ECC module 618) comprise various physically distinct modules or circuits. In other embodiments, the modules (e.g., local cache 614, firmware 616 and ECC module 618) may completely (or partially) be implemented in software or firmware.

As illustrated, firmware 616 comprises the core of the controller and manages all operations of the controller 606. The firmware 616 may implement some or all of the methods described above. Specifically, the firmware 616 may implement the methods described in the foregoing figures.

Figure 7:
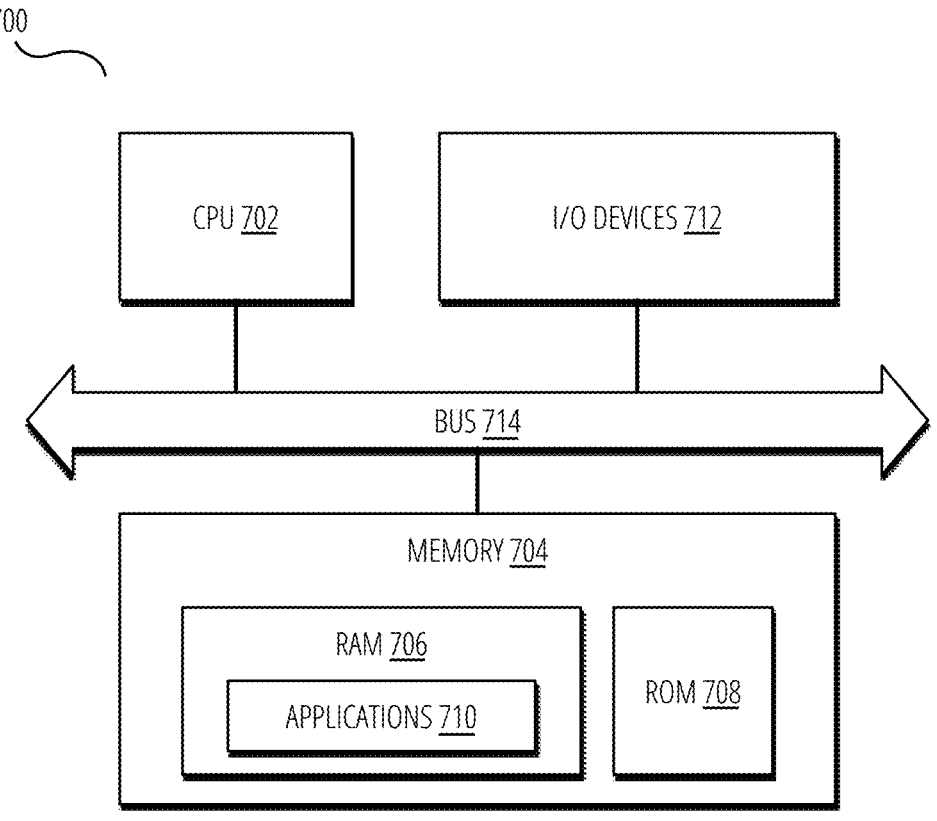
FIG. 7 is a block diagram illustrating a computing device showing an example embodiment of a computing device according to some of the example embodiments.

FIG. 7 is a block diagram of a computing device according to some embodiments of the disclosure.

As illustrated, the device 700 includes a processor or central processing unit (CPU) such as CPU 702 in communication with a memory 704 via a bus 714. The device also includes one or more input/output (I/O) or peripheral devices 712. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 702 may comprise a general-purpose CPU. The CPU 702 may comprise a single-core or multiple-core CPU. The CPU 702 may comprise a system-on-a-chip (SoC) or a similar embedded system. In some embodiments, a graphics processing unit (GPU) may be used in place of, or in combination with, a CPU 702. Memory 704 may comprise a memory system including a dynamic random-access memory (DRAM), static random-access memory (SRAM), Flash (e.g., NAND Flash), or combinations thereof. In one embodiment, the bus 714 may comprise a Peripheral Component Interconnect Express (PCIe) bus. In some embodiments, the bus 714 may comprise multiple busses instead of a single bus.

Memory 704 illustrates an example of a non-transitory computer storage media for the storage of information such as computer-readable instructions, data structures, program modules, or other data. Memory 704 can store a basic input/output system (BIOS) in read-only memory (ROM), such as ROM 708 for controlling the low-level operation of the device. The memory can also store an operating system in random-access memory (RAM) for controlling the operation of the device.

Applications 710 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 706 by CPU 702. CPU 702 may then read the software or data from RAM 706, process them, and store them in RAM 706 again.

The device may optionally communicate with a base station (not shown) or directly with another computing device. One or more network interfaces in peripheral devices 712 are sometimes referred to as a transceiver, transceiving device, or network interface card (NIC).

An audio interface in peripheral devices 712 produces and receives audio signals such as the sound of a human voice. For example, an audio interface may be coupled to a speaker and microphone (not shown) to enable telecommunication with others or generate an audio acknowledgment for some action. Displays in peripheral devices 712 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 712 may comprise any input device arranged to receive input from a user. An illuminator in peripheral devices 712 may provide a status indication or provide light. The device can also comprise an input/output interface in peripheral devices 712 for communication with external devices, using communication technologies, such as USB, infrared, Bluetooth®, or the like. A haptic interface in peripheral devices 712 provides tactile feedback to a user of the client device.

A GPS receiver in peripheral devices 712 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 7, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer readable medium (or computer-readable storage medium) stores computer data, which data can include computer program code or instructions that are executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A system comprising:
a memory device including a key storage area;
a key management server (KMS) configured to receive a key request, generate a cryptographic key, compute a hash of the cryptographic key, and return the cryptographic key and the hash in response to the key request;
a manufacturer computing device configured to receive the cryptographic key and the hash as part of the response to the key request and issue a command including the cryptographic key and the hash to the memory device,
wherein the memory device is configured to compute a local hash using the cryptographic key in the command, compare the local hash to the hash, and write the cryptographic key to the key storage area when the local hash matches the hash; and
a customer computing device configured to:
generate a second cryptographic key and a second hash corresponding to the second cryptographic key; and
issue a second command including the second cryptographic key and the second hash to the memory device.

2. The system of claim 1, wherein the cryptographic key comprises one of a public key portion or private key portion of an asymmetric key pair.

3. The system of claim 1, wherein the cryptographic key comprises a Unique Device Secret.

4. The system of claim 1, wherein the cryptographic key comprises a symmetric key.

5. The system of claim 1, wherein the manufacturer computing device is further configured to detect a failure response associated with the command, request a second cryptographic key and a second hash from the KMS in response to the failure response, and issue a second command including the second cryptographic key and the second hash to the memory device.

6. The system of claim 1, wherein the customer computing device is further configured to:

wherein the memory device is configured to compute a second local hash using the second cryptographic key in the second command, compare the second local hash to the second hash, and write the second cryptographic key to the key storage area if the second local hash is equal to the second hash.

7. The system of claim 6, wherein the customer computing device is further configured to include a signature in the second command.

8. The system of claim 6, wherein writing the second cryptographic key to the key storage area comprises overwriting an existing cryptographic key.

9. The system of claim 1, wherein the memory device is further configured to determine that the local hash does not match the hash and, in response, not write the cryptographic key to the key storage area.

10. The system of claim 9, wherein the memory device returns a failure response in response to determining that the local hash does not match the hash.

11. A method comprising:

receiving, by a memory device, a command, the command including a cryptographic key and a hash of the cryptographic key;

generating, by the memory device, a local hash by inputting the cryptographic key into a hashing algorithm;

determining, by the memory device, whether the local hash matches the hash included in the command;

writing, by the memory device, the cryptographic key to a key storage area if the local hash matches the hash included in the command;

returning, by the memory device, a failure response if the local hash does not match the hash included in the command;

generating a second cryptographic key, by a customer computing device, and a second hash corresponding to the second cryptographic key; and issuing a second command including the second cryptographic key and the second hash to the memory device.

12. The method of claim 11, wherein the cryptographic key comprises one of a public key, a private key, a symmetric key, and a Unique Device Secret.

13. The method of claim 11, wherein determining whether the local hash matches the hash included in the command comprises determining if the local hash is equal to the hash included in the command.

14. The method of claim 11, wherein writing the cryptographic key to a key storage area comprises overwriting an existing key stored in the key storage area.

15. The method of claim 11, wherein returning a failure response comprises returning failure response data as part of the failure response.

16. A non-transitory computer-readable storage medium for tangibly storing computer program instructions capable of being executed by a computer processor, the computer program instructions defining steps of:

receiving a command, the command including a cryptographic key and a hash of the cryptographic key;

generating a local hash by inputting the cryptographic key into a hashing algorithm;

determining whether the local hash matches the hash included in the command;

writing the cryptographic key to a key storage area if the local hash matches the hash included in the command;

returning a failure response if the local hash does not match the hash included in the command;

generating a second cryptographic key and a second hash corresponding to the second cryptographic key; and issuing a second command including the second cryptographic key and the second hash to the memory device.

17. The non-transitory computer-readable storage medium of claim 16, wherein the cryptographic key comprises one of a public key, a private key, a symmetric key, and a Unique Device Secret.

18. The non-transitory computer-readable storage medium of claim 16, wherein determining whether the local hash matches the hash included in the command comprises determining if the local hash is equal to the hash included in the command.

19. The non-transitory computer-readable storage medium of claim 16, wherein writing the cryptographic key to a key storage area comprises overwriting an existing key stored in the key storage area.

20. The non-transitory computer-readable storage medium of claim 16, wherein returning a failure response comprises returning failure response data as part of the failure response.

* * * * *